Sept. 15, 1931.   J. L. GRAY   1,823,194
MOTION CONTROLLING ATTACHMENT FOR CUTTING TORCHES
Filed Sept. 2, 1930   2 Sheets-Sheet 1
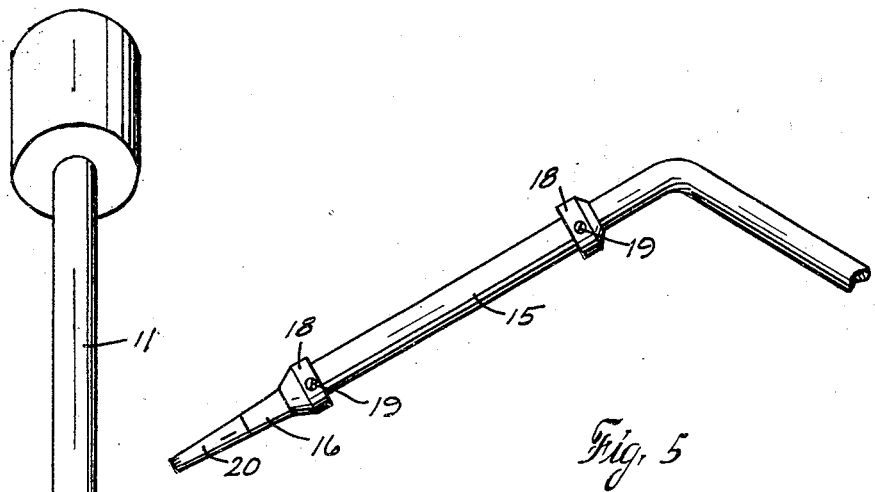
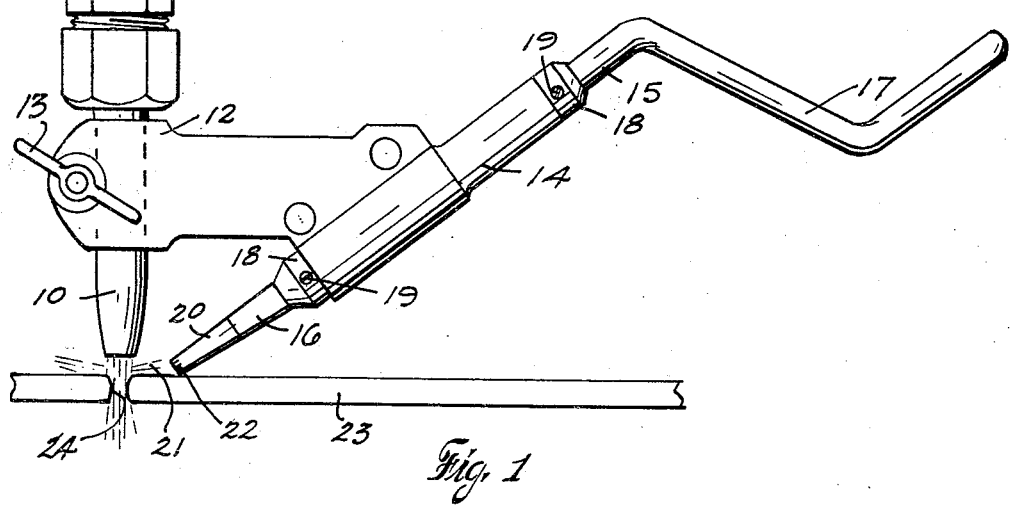
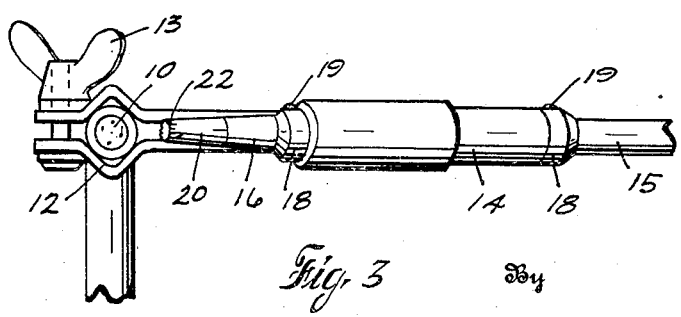
Inventor
Jesse L. Gray
By
Jack A. Ashley
Attorney Sept. 15, 1931.    J. L. GRAY    1,823,194
MOTION CONTROLLING ATTACHMENT FOR CUTTING TORCHES
Filed Sept. 2, 1930    2 Sheets-Sheet 2
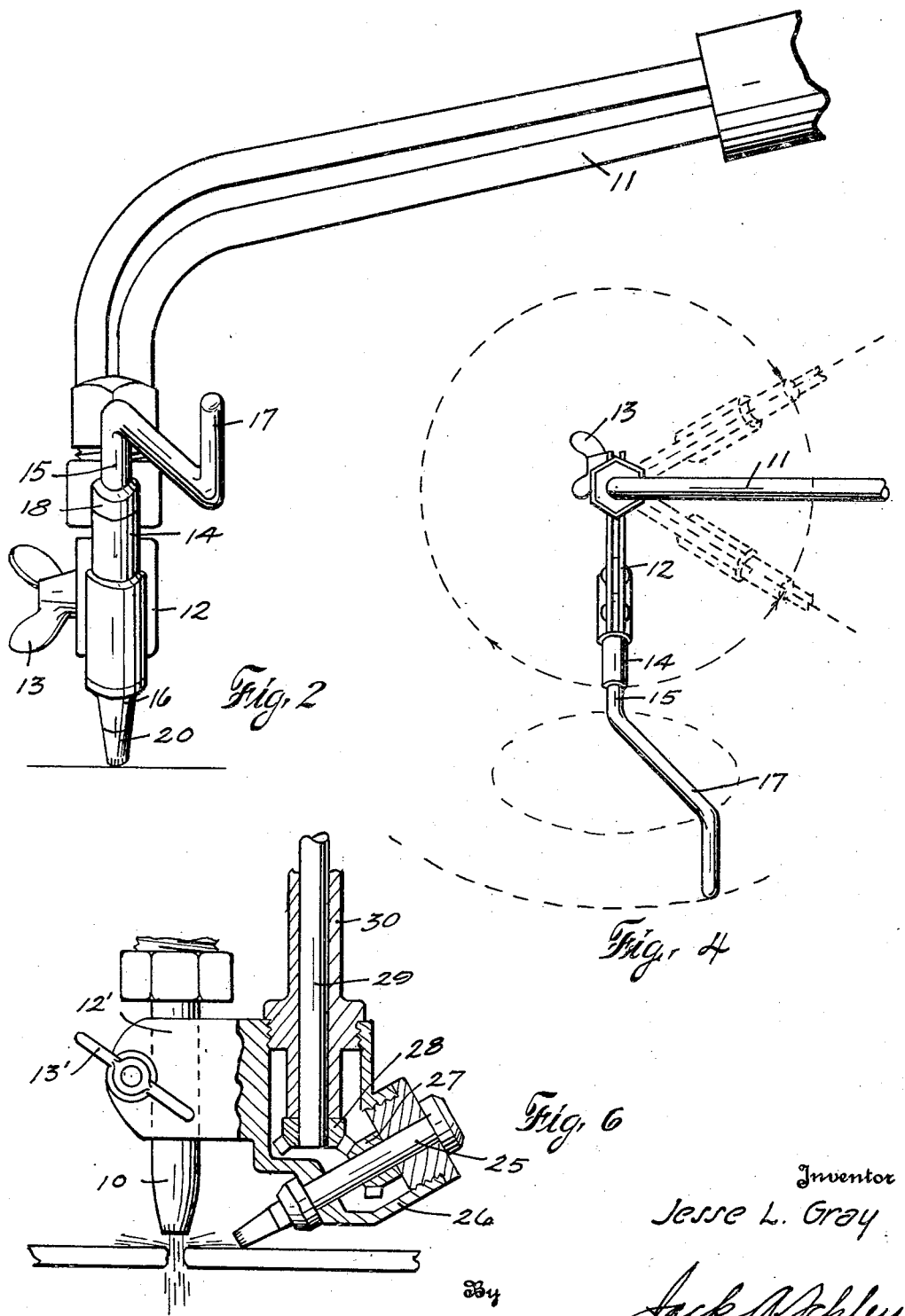
Inventor
Jesse L. Gray
By
Jack A. Ashley
Attorney Patented Sept. 15, 1931

1,823,194

UNITED STATES PATENT OFFICE

JESSE L. GRAY, OF DALLAS, TEXAS

MOTION CONTROLLING ATTACHMENT FOR CUTTING TORCHES

Application filed September 2, 1930. Serial No. 479,380.

This invention relates to new and useful improvements in motion controlling attachments for cutting torches.

One object of the invention is to provide an improved motion controlling attachment to be adapted to manually operate cutting torches for controlling and imparting steady motion to said torch, whereby smooth edged cuts may be made without the use of straight edges, guides or templates, thus making for efficiency and speed in operation.

Another object of the invention is to provide a simple and practical manually operated motion controlling attachment which may be easily and quickly adapted to and removed from a cutting torch.

A further object of the invention is to provide improved means for steadying and accurately guiding a cutting torch along a predetermined course, whereby the highest cutting speed of which the torch is capable may be maintained the length of the cut and a smooth and finished cut produced.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a side elevation of a device constructed in accordance with the invention and attached to the forward or cutting end of a cutting torch, Figure 2 is a side elevation of the same, Figure 3 is a bottom view of the same, Figure 4 is a reduced plan view showing the circumferential range of positions in which the attachment may be adjusted with relation to the torch, Figure 5 is a sectional view of the spindle, and Figure 6 is a sectional elevation showing a modified form of attachment having a vertical geared drive.

In the drawings the numeral 10 designates the tip or nozzle of a manually operated cutting torch of the oxyacetylene type, or any other type suitable for the purpose. A clamp 12 having an adjusting screw 13 is secured on the nozzle 10 and rigidly supports, at an inclination to the nozzle, a spindle housing 14. A spindle 15 having one end 16 tapered and its opposite end shaped to form a crank handle 17 is journaled in the housing and rotatably secured therein by means of collars 18 which are secured on said spindle by set screws 19.

A suitable heat resisting tip 20 of stellite, carboloy, or other suitable material, is brazed or welded onto the tapered end 16, whereby the deflected pre-heating flame 21 of the torch will not affect said spindle end. The outer end of the tip 20 is flat and is knurled about its edge, thereby providing a sharp tooth edge 22. This edge 22 will bite into the surface of the object 23 which is being cut and thereby prevent slippage and assure positive traction of said spindle when rotated and also steady the nozzle vertically, horizontally and longitudinally of the work.

It is pointed out that the device may be adjusted in various positions circumferentially of the nozzle 10, as shown in Figure 4; also that the spacing of the nozzle 10 from the cutting surface may be easily varied by adjusting the clamp vertically of said nozzle; and that the tip 20 provides means for tracing or following a line or design.

In operation the handle end of the torch 11 is supported as usual by hand with the weight of the forward or nozzle end resting on the edge 22 of the spindle. Then by rotating the spindle by means of the crank 17 a steady forward motion is imparted to the torch, said motion being at right-angles to the position in which the attachment is clamped to said torch. The forward movement of the torch is guided by swinging the torch handle to the right or left as desired. In this manner curved, irregular or angular cuts may be made without the use of templates or guides.

An important feature resulting from the use of the attachment is that the steady motion imparted to the torch results in a smooth edged cut 24, which is suitable for many articles of manufacture. Obviously, the time saved by making cuts at the highest possible cutting speed, together with the elimination of expensive guides, templates, and their relative equipment, makes for efficiency, speed and ease in operation of a manually operated cutting torch.

In Figure 6 I have shown a geared modification of the attachment comprising a spindle 25 journaled in a housing 26 and having a bevelled gear 27 mounted thereon. This gear is driven by a bevelled gear 28 mounted on the lower end of a drive shaft 29, which is journaled in an elongated shank 30 screwed into the housing 26. A shaft 29 may be driven in any suitable manner. The housing 26 is provided with a clamp 12' and an adjusting screw 13' for securing said attachment to the nozzle 10.

Various changes in the size and shape of the different parts, as well as modifications and alterations, may be made within the scope of the appended claims.

What I claim, is:

1. In an attachment for cutting torches, a clamp, a rotatable spindle supported by said clamp at an inclination thereto, and means for manually rotating said spindle.

2. An attachment for cutting torches as set forth in claim 1, with a heat resisting tip on said spindle.

3. An attachment for cutting torches as set forth in claim 1, with a traction edge on the spindle.

4. In a motion controlling attachment for cutting torches, a carriage, a rotatable traction support for said carriage, and means for manually rotating said support to impart motion to said carriage.

5. A motion controlling attachment for cutting torches as set forth in claim 3, with a sharp supporting edge on said traction support for biting into the work to steady said support and prevent slippage of the same.

6. In an attachment for cutting torches, a clamp support, a rotary spindle having a work engaging element carried by said support, and means for rotating said spindle.

7. In an attachment for cutting torches, a rotatable tracing element having actuating means, and means for supporting the tracing element at an inclination to the torch.

8. In an attachment for cutting torches, a support for attachment to the nozzle of the torch, a rotatable tracing element carried by the support and having a traction end for engaging to the work, and means for rotating the element whereby the torch nozzle and attachment are progressively moved along the work.

In testimony whereof I affix my signature

JESSE L. GRAY.